United States Patent
McNeely

(10) Patent No.: US 8,005,121 B2
(45) Date of Patent: *Aug. 23, 2011

(54) APPARATUS AND METHOD FOR RE-SYNTHESIZING SIGNALS

(75) Inventor: David Lowell McNeely, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 620 days.

This patent is subject to a terminal disclaimer.

(21) Appl. No.: 11/919,408

(22) PCT Filed: May 4, 2006

(86) PCT No.: PCT/US2006/017352
§ 371 (c)(1),
(2), (4) Date: Oct. 26, 2007

(87) PCT Pub. No.: WO2006/119489
PCT Pub. Date: Nov. 9, 2006

(65) Prior Publication Data
US 2010/0067431 A1    Mar. 18, 2010

Related U.S. Application Data

(60) Provisional application No. 60/677,563, filed on May 4, 2005.

(51) Int. Cl.
*H04J 1/00* (2006.01)
*H04J 3/04* (2006.01)

(52) U.S. Cl. .......................... 370/535; 370/480

(58) Field of Classification Search .................. 370/281, 370/319, 343, 480, 316, 535; 455/13.2
See application file for complete search history.

(56) References Cited

U.S. PATENT DOCUMENTS

| 5,924,031 | A * | 7/1999 | Copeland et al. | 455/428 |
| 7,054,281 | B2 * | 5/2006 | McNeely | 370/316 |
| 2001/0012277 | A1 * | 8/2001 | Campanella | 370/323 |
| 2002/0159399 | A1 * | 10/2002 | Stephenson | 370/281 |
| 2003/0217362 | A1 * | 11/2003 | Summers et al. | 725/63 |
| 2004/0185775 | A1 * | 9/2004 | Bell et al. | 455/12.1 |
| 2005/0010626 | A1 * | 1/2005 | Laksono et al. | 708/300 |

FOREIGN PATENT DOCUMENTS

| JP | 2000-517486 | 6/1997 |
| JP | 10-336537 | 12/1998 |
| JP | 11-146373 | 5/1999 |

(Continued)

*Primary Examiner* — Ricky Ngo
*Assistant Examiner* — Paul Masur
(74) *Attorney, Agent, or Firm* — Robert D. Shedd; Vincent E. Duffy; Michael A. Pugel

(57) ABSTRACT

The disclosed embodiments relate to an apparatus and a method for re-synthesizing signals. The apparatus includes a receiver for receiving a plurality of digitally multiplexed signals, each digitally multiplexed signal associated with a different physical transmission channel, and for simultaneously recovering from at least two of the digital multiplexes a plurality of bit streams. The apparatus also includes a transmitter for inserting the plurality of bit streams into different digital multiplexes and for modulating the different digital multiplexes for transmission on different transmission channels. The method involves receiving a first signal having a plurality of different program streams in different frequency channels, selecting a set of program streams from the plurality of different frequency channels, combining the set of program streams to form a second signal, and transmitting the second signal.

20 Claims, 7 Drawing Sheets

FOREIGN PATENT DOCUMENTS

| | | |
|---|---|---|
| JP | 2000-252932 | 8/2000 |
| JP | 2001-160833 | 6/2001 |
| WO | WO03/081906 | 10/2003 |
| WO | WO2004/073229 | 8/2004 |

* cited by examiner

APPARATUS AND METHOD FOR RE-SYNTHESIZING SIGNALS

This application claims the benefit under 35 U.S.C. §119 of a provisional application 60/677563 filed in the United States on May 4, 2005.

This application claims the benefit under 35 U.S.C. §365 of International Application PCT/US2005/045438, filed Dec. 16, 2005, which was published in accordance with PCT article 21(2) on Oct. 26, 2006 in English.

FIELD OF THE INVENTION

The present invention generally relates to communications systems. More specifically, the present invention relates to the receiving and retransmission of content within a communications system.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In today's data communication systems such as used in satellite TV, data of different types often reside in what are known as virtual channels. The data from these virtual channels is separately disassembled into data packets, aggregated within and across different data types into bit streams and conveyed by packet delivery systems. Data consumer appliances, such as satellite receivers, select from physical channels available to them, convert the signals on these channels to digital form (packets) and collect the data packets required to re-assemble the desired virtual channels of information (e.g., audio, video, program guide, transactional data, etc.). At different points along the data path between a content provider and a content consumer data management opportunities occur. A piece of data may come from one of many sources, be routed through one of many satellites, pass through several of many transponders aboard the satellite, be received by a consumer antenna, and be distributed to places of consumption.

Consumer receivers are often capable of receiving only one of the physical channels from the satellite at a time for display. However, new receivers may contain advanced features the consumer can use. For instance, a receiving device may contain more than one tuner for use in either two picture simultaneous display systems or content recording. Additionally, consumer households often include multiple receivers, each receiver requiring the tuning of one or more channels for use.

The ever-expanding amount of content for delivery has made it very difficult to deliver that content to all places at all times. Systems receiving data from up to four separate satellites to deliver programming is to the home can no longer deliver all of the content on one coaxial cable connection. Various approaches have been adapted including the use of multiple cables or complex switching arrangements. Many of these approaches are in some manner suboptimal for a home installation due to high cost or high complexity.

Another solution may be to employ a system of preselecting, combining, and redistributing the incoming content based on the physical channels requested by the user(s) using analog signal processing. As a result, only the content required for delivery to the receivers in a household are selected from the initial available content. The desired content may then be provided on a single cable that is relatively easy to distribute around the household. The solution relies on coarse analog signal tuning and re-mixing to move channels or frequency regions of signals from an original spectral location in frequency at the input to another spectral location in frequency on a common signal at the output. Further, channels or signal regions at the same frequency but on different satellites may be combined by moving one or both of the original channels or regions. These relocated signals containing the desired channels are then provided on the single cable, eliminating the need for any additional switching and multiple cable connections.

The analog solution involving preselection, combination, and redistribution remains limited in the number of channels that can be provided due to the inherent shortcomings of performing the processing in the analog domain. Narrow band filters used to select individual physical channels while rejecting others are impractical at frequencies above the range of one gigahertz (GHz). Available filters having a practical bandwidth require additional channel separation in order to prevent undesired interferences in the output signal. Additionally as the desire to deliver more requested channels to the home increases, the subsequent increase in analog circuit complexity results in an expensive and inefficient design with potential problems due to analog crosstalk. Further, the analog solution does not include additional capabilities involving channel data re-mulitplexing that may prove useful. The ability to manipulate the data streams in the digital domain increases the value and feature set of the network. Therefore, an apparatus and process for receiving and re-synthesizing of channels for distribution in a more optimal manner is desired.

SUMMARY OF THE INVENTION

The present invention relates to an apparatus and a method for re-synthesizing signals. The apparatus includes a receiver for receiving a plurality of digitally multiplexed signals, each digitally multiplexed signal associated with a different physical transmission channel, and for simultaneously recovering from at least two of the digital multiplexes a plurality of bit streams. The apparatus also includes a transmitter for inserting the plurality of bit streams into different digital multiplexes and for modulating the different digital multiplexes for transmission on different transmission channels.

The method involves receiving a first signal having a plurality of different program streams in different frequency channels, selecting a set of program streams from the plurality of different frequency channels, combining the set of program streams to form a second signal, and transmitting the second signal.

Figure 1:
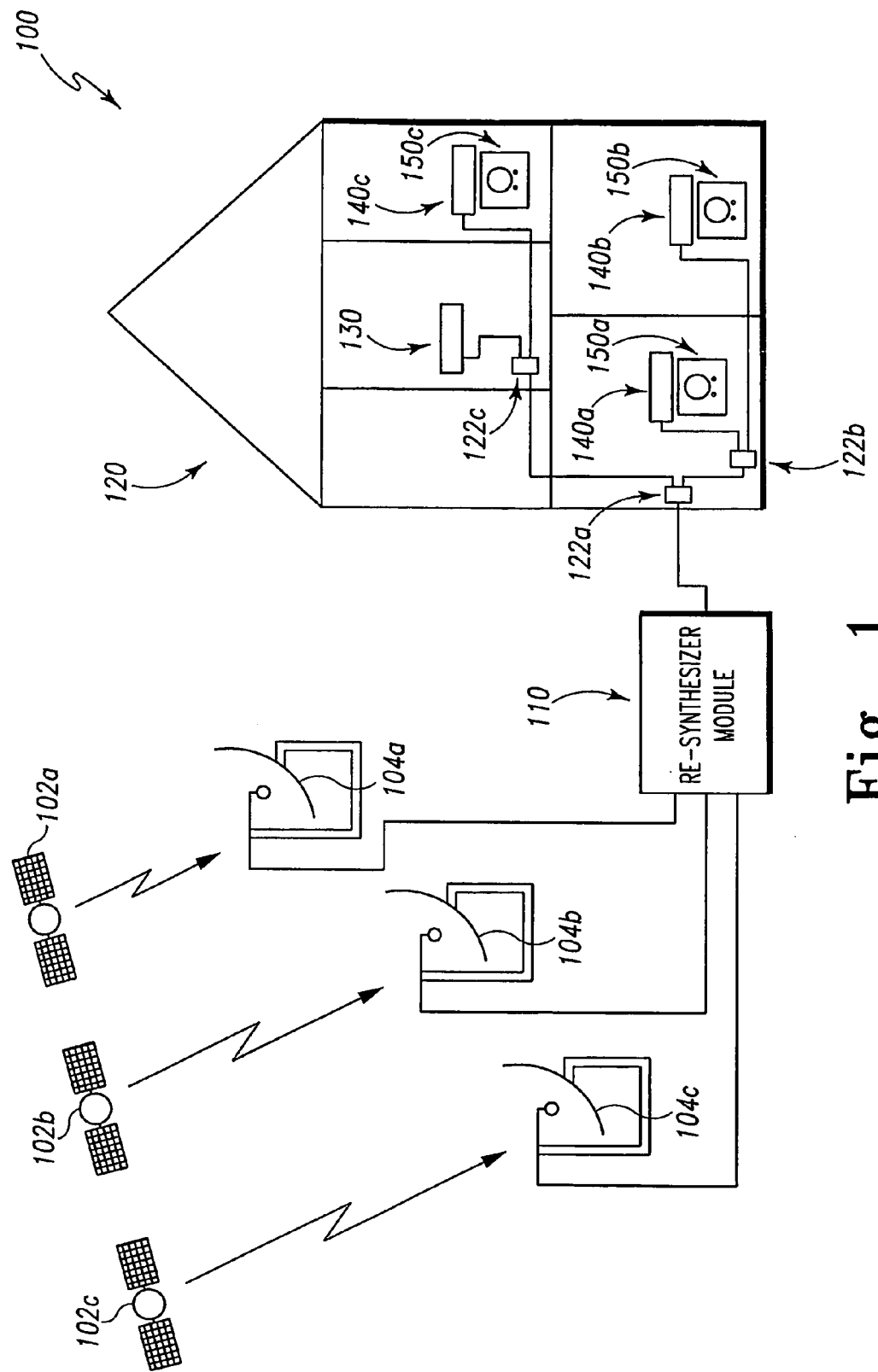
FIG. 1 is a block diagram of an exemplary system using the present invention.

The characteristics and advantages of the present invention may become more apparent from the following description, given by way of example.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It is noted that familiarity with television broadcasting and receivers is assumed and is not described in detail herein. For example, other than the inventive concept, familiarity with current and proposed recommendations for TV standards such as National Television Systems Committee (NTSC), Phase Alternation Lines (PAL), Sequential Couleur Avec Memoire (SECAM), Advanced Television Systems Committee (ATSC), and Direct Broadcast Satellite (DBS) is assumed. Likewise, other than the inventive concept, transmission concepts such as satellite transponders, down-link signals, eight-level vestigial sideband (8-VSB), Quadrature Amplitude Modulation (QAM), and receiver components such as a radio-frequency (RF) front-end, or receiver section, such as a low noise block, tuners, and demodulators is assumed. Similarly, formatting and encoding methods (such as Moving Picture Expert Group (MPEG)-2 Systems Standard (ISO/IEC 13818-1)) for generating transport bit streams are well-known and not described herein. In addition, the inventive concept may be implemented using conventional programming techniques which, as such, will not be described herein.

The following describes a circuit used for processing satellite signals. Other systems utilized to receive and transmit other types of signals where the signal input may be supplied by some other means may include very similar structures. Those of ordinary skill in the art will appreciate that the embodiment of the circuits described herein is merely one potential embodiment. As such, in alternate embodiments, the components of the circuit may be rearranged or omitted, or additional components may be added. For example, with minor modifications, the circuits described may be configured to for use in non-satellite video and audio services such as those delivered from a cable network. Further, the re-synthesizer described could be used in conjunction with a home networking system. The re-synthesizer may receive inputs from a satellite or cable network, process them, and provide them as an output to the home network system. The output may in the form of a wired or wireless transmission.

Turning now to the drawings and referring initially to FIG. 1, an overall block diagram 100 of a system using the present invention is shown. FIG. 1 represents a typical satellite system installation at a customer home. A similar installation may also exist at an apartment complex or hotel where the system may be augmented with additional equipment often incorporated in multi-dwelling unit applications. Satellite transponders located on satellites 102*a-c* transmit satellite signals to satellite dishes 104*a-c*. Each satellite dish contains a reflector, a feed horn and a low noise block converter (LNB).

Each of the satellite signals may represent one or more individual physical channels. Each of the physical channels may in turn represent one or more preferably digital bit streams of information combined together as a digital multiplex, encoded, and modulated using various analog and/or digital modulation techniques. The digital data streams are usually called program streams and may be streams of audio, video, or other data including program guide information. The physical channels are often grouped to cover a limited frequency range such as 500 to 1000 MHz of bandwidth. The satellite signals are often located in the microwave frequency range, for instance 11-13 Gigahertz (GHz). The LNBs in the satellite dishes 104*a-c* will amplify and convert the satellite signal in the 11-13 GHz range to an L-band signal in the 1-2 GHz frequency range. Although three satellite dishes are shown, the orbital locations of the satellites 102*a-c* may permit using one satellite dish containing one reflector and three feed horns and LNBs. Also, systems may utilize more. or fewer than the three satellites signals illustrated here. The systems may additionally use techniques such as polarization diversity to increase the number of satellite signals delivered from each satellite.

Each of the three L-band signals from the satellite dishes 104*a-c* are provided through separate coaxial cables to a re-synthesizer 110. The three L-band signals in their entirety cannot be supplied through a single coaxial cable for delivery into the customer home, because the L-band signals occupy too much frequency bandwidth. As previously described, each L-band signal may occupy 1 GHz of bandwidth, and a typical customer premises cable installation may only support less than 2 GHz of total signal bandwidth. The re-synthesizer 110 extracts certain ranges of frequencies containing selected physical channels as portions of the three L-band signals provided. The re-synthesizer 110 also frequency translates the extracted ranges as needed and re-combines them to form a new single selected L-band signal. The process used by the re-synthesizer 110 may be described as a preselection of certain physical channels. However, the process used by the re-synthesizer 110 is different from a direct tuning of those certain physical channels since other energy besides the selected channel may be present, and the channels are then recombined to form a new signal for further distribution. Further, the re-synthesizer 110 also provides processing to recover the individual program streams from the physical channels present. The re-synthesizer 110 may also allow adding or removing of streams as well as re-arrangement of streams to form new physical channels of information. Note that the FTM 110 may reside physically outside the customer home as shown, or may reside very near to the entry point into the customer home or a multi-dwelling unit. For example, the re-synthesizer may be located in a room adjacent to the entry point for the cabling from the satellite dishes 104*a-c*. The room may include additional control devices for use with the network and the re-synthesizer 110.

Once the re-syhthesizer 110 has preselected and processed the physical channels for use, the selected signal is provided over a single coaxial cable to the customer's premises 120. The selected signal may pass through a set of signal splitters 122*a-c*, as needed, to supply each of the locations for the premises installation. The splitters 122*a-c* may contain passive circuits such as transformers and resistors or may also contain amplifiers in order to increase the signal level at the installation location.

At each installation location in the premises 120, the selected signal is provided to a standalone terminal 130 or to a combination settop box 140a-c and display device 150a-c. The terminal 130 and settop box 140a-c operate in a similar manner. Each of them receive the selected signal, tune to the desired physical channel within the selected signal, demodulate the physical channel to produce a transport stream, and extract the desired bit stream(s) from the transport stream. The terminal 130 may be used for local storage of various bit streams or for distribution of these bitstreams over a different network such as a wireless network or an Ethernet connection. The settop box 140a-c converts the desired bitstream(s) into video and audio signals for display on the display device 150a-c.

The terminal 130 and settop boxes 140a-c may provide one or more control signals back onto the cable to the re-synthesizer 110. The control signal is generated based on inputs provided, for instance by a customer. The control signal sent to re-synthesizer 110 contains information necessary to perform the preselection and processing of frequency ranges, physical channels; and program streams from each of the L-band signals. The communication protocol to the re-synthesizer 110 may be done in a manner suitable for delivery as is known in the art, such as frequency shift keying FSK protocol. The control signal may alternately be supplied through a wireless link. Electrical power may also be passed through the coaxial cable to the re-synthesizer 110 and further on to the satellite dishes 104a-c.

As described earlier, a conventional re-synthesizer, sometimes known as a frequency translation module, contains analog signal processing used for the filtering, mixing, and recombining of the L-band signals. Analog signal processing contains limitations when operating at high frequencies in the 1 GHz range, and the complexity of the analog signal processing increases significantly with an increase of the number of selected physical channels. The utilization of digital signal processing within the re-synthesizer structure permits greater flexibility and removes some of the limitations of analog signal processing. The digital processing further permits recovery and processing of the program streams permitting additional flexibility and efficiency.

Figure 2:
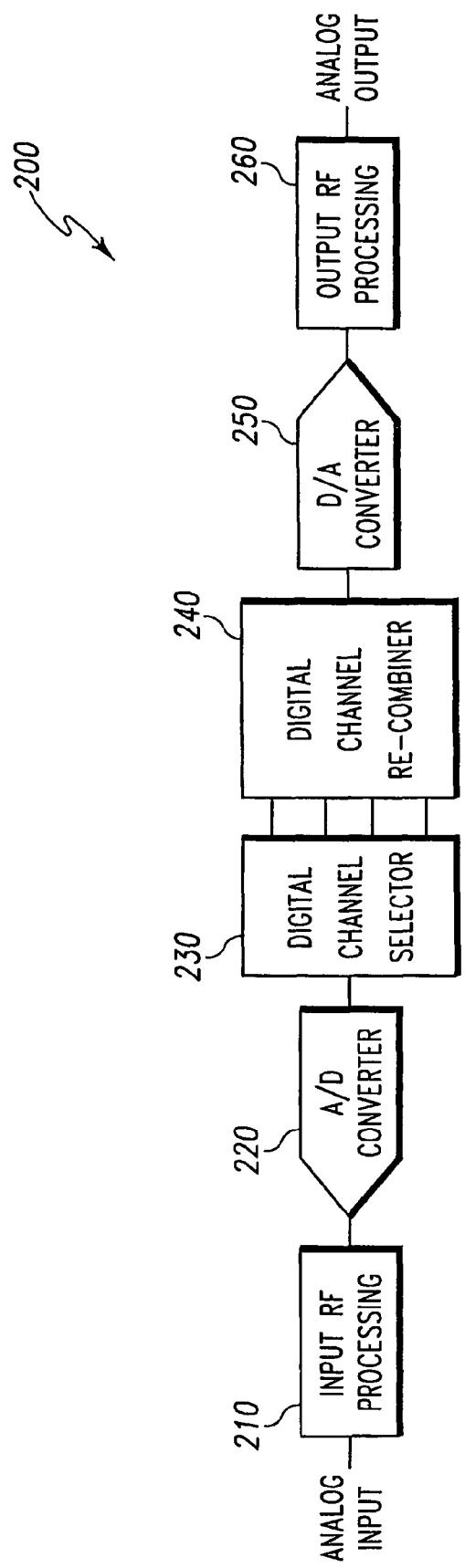
FIG. 2 is a block diagram of an embodiment of the present invention

Turning now to FIG. 2 a block diagram 200 of an embodiment of the present invention is shown. The diagram shows an implementation of the re-synsthesizer 110 that includes digital signal processing in order to increase the performance and available bandwidth for selected channels. In order to facilitate a further understanding of the invention, a re-synthesizer 110 will be described here using only a single L-band signal as an input. Further, the re-synthesizer 110 described here will include the capabilities only to translate frequency ranges or physical channels from the input to the output. The single L-band signal, as an analog input, is processed through an RF processing block 210. The RF processing block 210 may contain circuitry for filtering undesired energy outside the signal frequency range, may correct for any frequency response errors introduced, and may amplify the signal to a level necessary for input to the analog to digital (A/D) converter 220. The input RF processing block 210 may also contain any mixing circuits necessary to position the L-band signal in the correct frequency range for operation of the A/D converter 220.

The A/D converter 220 digitizes the processed L-band signal into a series of samples, each sample containing a group of bits. In an exemplary embodiment, the processed satellite signal is located between the frequencies of 975 and 1425 MHz. The A/D converter 220 samples the processed L-band signal at a rate of 933 megasamples per second (MSPS) generating a digital signal containing a series of samples, each sample represented by 8 bits. The A/D converter 220, may also generate a translated frequency image of the L-band signal essentially translating the signal from an initial frequency range in the analog domain to a different frequency range based on sampling principles. A clock signal, not shown, is supplied to the A/D converter for performing the sampling. The clock signal may be generated by a crystal or as part of a voltage controlled oscillator. The clock signal may also directly, or through additional multipliers and dividers, supply signals to other blocks within the re-synthesizer 110.

The digital channel selector 230 receives the sampled signal and proceeds to select and down-convert each of the individual physical channels that have been selected. After processing, each of the selected individual channels are located within the same frequency range at or near to baseband, but are contained as individual signals on separate signal lines. The number of bits representing each selected individual channel may be different from the original sampled signal based on the processing method employed. The use of digital signal processing and processing of the signal in parallel permits narrower filtering constraints and more efficient channel selection within the re-synthesizer 110.

Each of the individual selected channels is provided to the digital channel re-combiner 240. The digital channel re-combiner 240 frequency translates the individual selected channels each to a different and separate frequency range and combines these signals together to form a single selected digital signal. The selected digital signal is supplied to a digital to analog (D/A) converter 250. The D/A converter 250 converts the selected digital signal to a selected analog signal. In a preferred embodiment, the selected digital signal provided to the D/A converter 250 is a series of 10 bit samples at a rate of 950 MSPS. The D/A converter 250 outputs a selected analog signal within a frequency range of DC to 475 MHz.

The selected analog signal is passed to the RF processing block 260. The RF processing block 260 provides any analog signal processing necessary to properly send the selected analog signal on the coaxial cable to the customer home. The RF processing block 260 may contain circuitry for filtering undesired signal energy outside the signal frequency range, such as the images produced by the sampling process in D/A converter 250. The RF processing block 260 may also correct for any other frequency response errors introduced, and may amplify the signal as necessary to provide the signal onto a coaxial cable. The RF processing block 260 may also contain a mixing circuit necessary to position the selected analog signal in the correct L-band frequency range, for instance 975-1425 MHz.

Some additional circuitry may also be included such as for controlling the blocks, receiving and processing user inputs, and additional signal processing, although this circuitry is not shown here.

Figure 3:
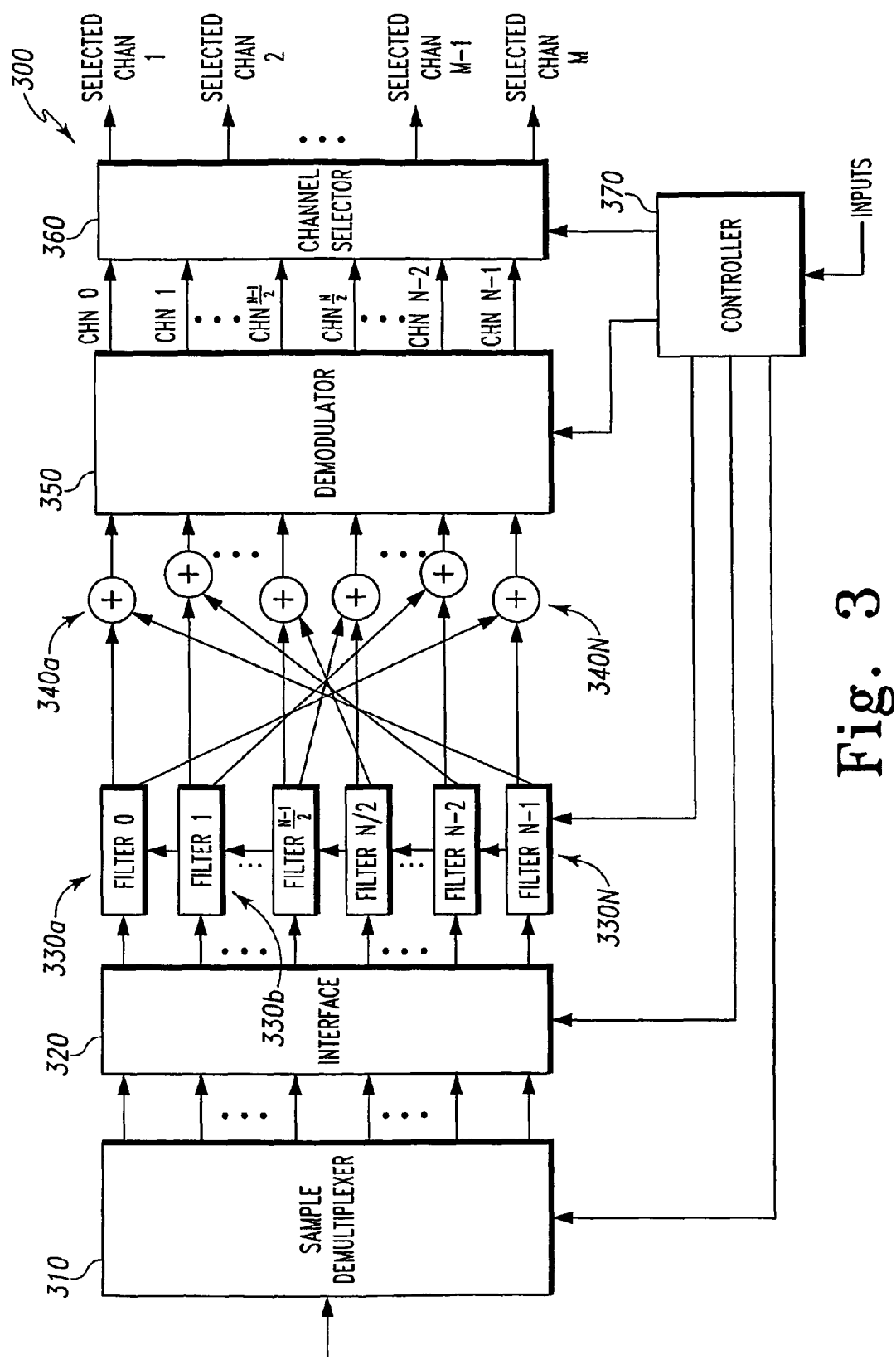
FIG. 3 is a block diagram of another embodiment of the present invention.

Turning now to FIG. 3, an illustrative block diagram of a circuit 300 of an embodiment of a portion of the present invention is shown. Circuit 300 represents circuitry contained with the digital channel converter block 230. A sampled signal, converted from an L-band signal by A/D converter 220, is provided to the sample demultiplexer 310. Sample demultiplexer 310 resamples at a demultiplexer sampling rate, $F_F$, (or post-decimation sampling rate) to provide a number of decimated sample streams in parallel.

Each of the decimated sample streams represents a sampled and time shifted version of the original signal with each of the folded spectra, from the decimation, aliased into the same decimated frequency space. The number of decimated sample streams, N, may be integrally related to the number of virtual channels in the original signal. In a preferred embodiment, the number of physical channels is sixteen. Further, the sample demulitplexer 310 sampling rate is preferably two times the data rate of one of the physical channels, or $F_F=2F_S$ where $F_S$ is the data rate of the physical channel. Each of the decimated sample streams passes through a sampling interface block 320. The sampling interface block 320 provides any sampling domain adjustments necessary in moving the signal from the A/D converter 220 and sample demulitplexer 310 to the filter bank 330a-N, connected to the sampling interface block 320. The filter bank 330a-N may provide a number of process steps including filtering the physical channels that are distributed within the decimated sample streams prior to the physical channels being separated. The filtering provides rejection of any energy not within a physical channel while generating a reconstructive set of base signals for selecting out the physical channels in further downstream processing. The filter bank 330a-N may also provide a time realignment of each of the decimated sample streams. In a preferred embodiment, the filter bank 330a-N consists of a bank of bifurcated filters that collectively generate a filtered signal vector. Since all the bifurcated filters have a similar structure, only one bifurcated filter is described in detail herein.

A bifurcated filter may typically consist of two parallel branches of coefficient multiply and delay operations with the operations in each of the branches separately summed together. Each branch is designated as either an even output signal or an odd output signal. The number of multiply and delay operations in each branch may vary based on design criteria. For instance, sixteen weighted multiply and a number of coefficient multipliers may be used in each bifurcated filter. The delay element is controlled by a decimated sample clock signal, not shown, at a frequency $F_f$. The summing node separately adds together those values from each of the odd weighted multipliers and even weighted multipliers to form the odd and even output signal. The orientation of the filter branches and operations within the branches allows special properties to exist. These properties include amplitude inversion of the signal or time reversing the signal within the branch. As noted, other filter structures may be used, as known to those skilled in the art, in conjunction with the various techniques of simultaneous channel reception techniques.

The output signal, a filter signal vector containing 2N signal streams; from the filter bank 330a-N connects to a bank of summing nodes 340a-N. Referring to the preferred embodiment, the even and odd outputs from each of the different bifurcated filters may be combined in a cross-coupling pattern. The even output of filter 0 is summed with the odd output of filter N-1, even output of filter 1 with the odd output of filter N-2, and so on as shown. The summing nodes 340a-N generate a set of filtered sample streams.

The filtered sample streams at the output of summing nodes 340a-N connect to a distributor block 350. The main purpose of the distributor block 350 is to process the filtered sample streams generated by the filter block 330a-N and summing nodes 340a-N to reconstruct the set of physical channels, originally provided in the L-band signal, from the decimated and filtered sample streams. The processing may include recombining the streams in a manner using mathematical operations. In a preferred embodiment the distributor block 350 uses a type IV Discrete Cosine Transform (DCT) for processing the filtered sample streams. The bifurcated filter structure described previously further permits a small DCT structure in implementation by making use of the inversion and time reversal properties of the filter. The bifurcated filter structure may also permit use of a DCT employing a sparse matrix decomposition structure.

The combination of the filter bank 330a-N, summing node 340a-N, and distributor 350 results in generating a set of output streams, each representing the separated data content from a physical channel. The set of individual physical channels from the distributor 350 are generated from the set of decimated sample streams where each stream contains content from each of the physical channels in a sample aliased condition. It should be noted that other methods may be employed for accomplishing recovery of separate physical channels simultaneously from a single signal.

The output of distributor block 350 represents N individual physical channels positioned at or near to baseband frequency. Each physical channel, in digital signal form, may be located on a separate signal line at the output of distributor block 350. Each of the separate signal lines connect to a channel selector block 360. The channel selector block 360 may select a set of physical channels from the original N input channels provided. Any number of channels up to the full number N may be selected. For instance, four channels may be selected. The number of channels permitted for selection in channel selector block 360 is a design choice, and the full number of permitted channels for selection does not have to be selected at any one time. Additionally, any further physical channel separation may be performed, such as removing any aliasing components present due to the complex form of the signal as a result of the previously described processing.

The channel selector block 360 receives inputs from a controller 370 regarding which, if any, of the originally received physical channels is currently requested by the customer. The controller 370 may connect to the sample demultiplexer 310, interface 320, filter bank 330a-N, and distributor 350 in addition to connecting to channel selector 360. The controller 370 may also provide an interface for user inputs or a communications input in order to receive and convey the user requested channel information from multiple locations. As described previously, the user inputs may be supplied through the signal cable or through some other communications means. Also, as described previously, a home or customer premises may supply more than one customer input. In addition, controller 370 may provide additional functions for operation of the demultiplexer 310, interface 320, filter bank 330a-N, and assembler 350, such as clock functions, as necessary. The controller 370 may also be embodied as a portion of a larger controller function responsible for controlling and managing, for instance, the entire FTM device.

Figure 4:
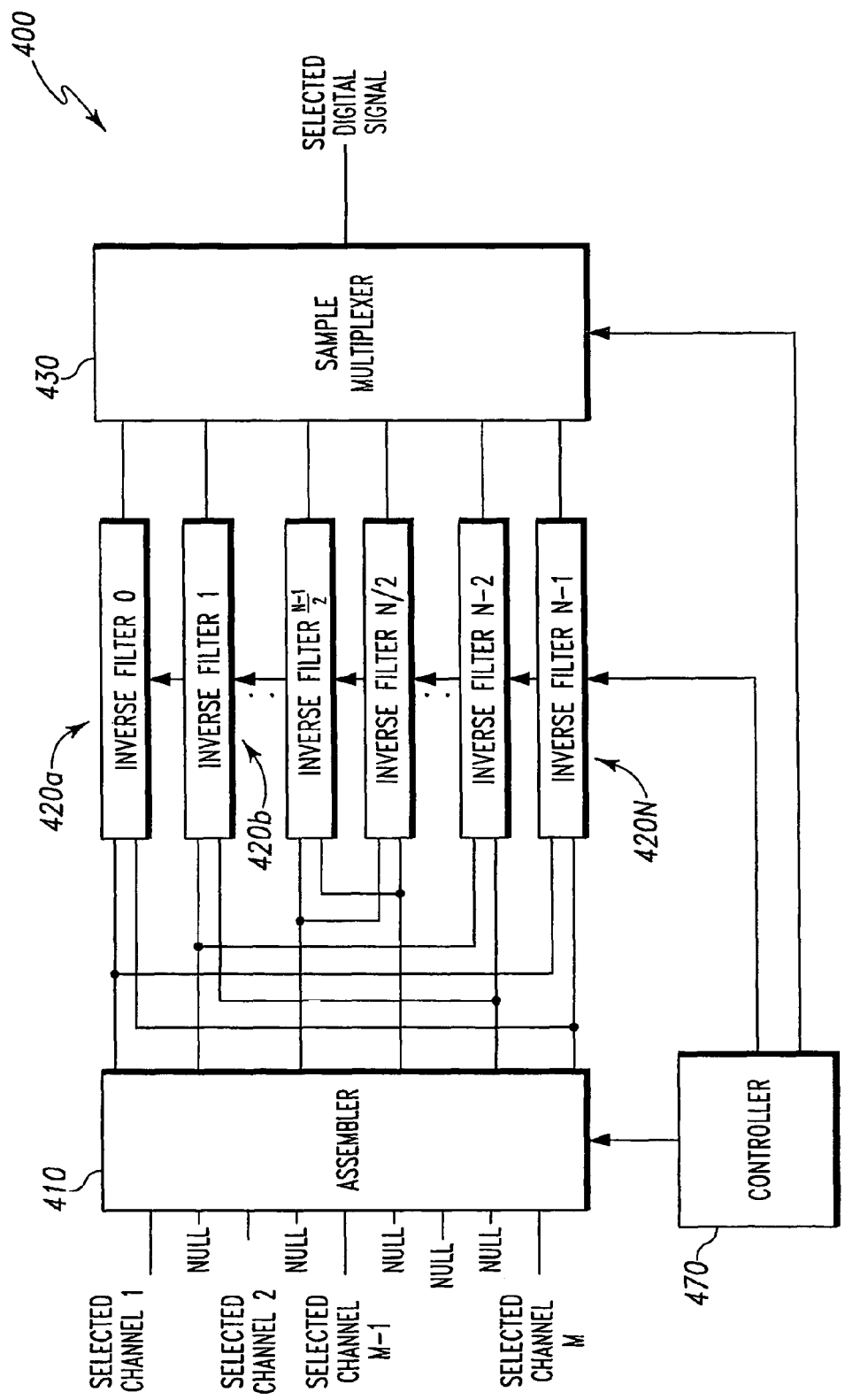
FIG. 4 is a block diagram of yet another embodiment of the present invention.

Turning now to FIG. 4, a block diagram 400 of a further embodiment of the present invention is shown. FIG. 4 illustrates an implementation of the digital channel re-combiner 240. The M outputs, representing a set of selected physical channels, of channel selector 360 are provided to the assembler 410. As described previously, the M outputs of the channel selector 360 may be equal to or less than the N physical channels present in the original L-band signal. In a preferred embodiment, the assembler 410 may receive up to N inputs. If the number of signals provided from channel selector 360 is less than N, the remaining inputs of channel assembler 410 are placed in a condition of "null" or no input. Additionally, the assembler 410 may also provide the ability to re-order the M input signals. For instance, if the M signals provided to the assembler 410 are physical channels in positions 1, 2, 3, and 4 from selection of the original N channels, the assembler 410 may re-position the M signals by addressing them as inputs 1, 5, 9, and N-1. In this manner, further processing, including internal or external filtering may be simplified. Also, the re-positioning permits re-spacing of the M signals.

The assembler 410 provides processing for converting the selected channels into a set of signals forming a base set of parallel data streams that can then be filtered prior to remultiplexing and converting to an analog signal. The channel re-combiner 410 provides N outputs as a set of converted sample streams to inverse filter bank 420a-N. The inverse filter bank 420a-N provides filtering and/or time delay operations necessary to permit signal remultiplexing. The output of the inverse filter bank 420a-N provides a set of inverse filtered sample streams.

The inverse filtered sample streams at the output of the inverse filter bank 420a-N are provided to the sample multiplexer 430. The sample multiplexer 430 re-combines the samples, in a time multiplexing fashion, into a single sample stream. The sampling rate of the new single sample stream is preferably $2NF_S$ ($F_S$ is the data rate of one channel). Clock signals representing both the input parallel sample stream rate and the new sampling rate at the output of the sample multiplexer 430 are also provided.

In a preferred embodiment, the assembler 410 is realized as an inverse type IV DCT, and the filter bank 420a-N is realized as an effective inverse bifurcated filter bank with respect to filter bank 330a-N as previously described. In this and other possible approaches, advantages exist due to the sparse matrix factorization stages containing a defined sparse inverse as well as the complementary form of the filtering stages. For example, the Type IV DCT is its own inverse i.e., (DCT IV)$^2$=I (identity matrix), and the bifurcated filters work with the transform elements to shape the bands of independent physical channels. Also, the inverse filter bank 420a-N, shown as a bifurcated filter structure has a signal splitting at its input for providing a cross coupling of signals to the even and odd branches of the individual filters. After each branch in the individual filters has completed processing, the even and odd branches of each individual filter are summed together to form the individual output signal.

Alternatively, since the type IV DCT function in both the distributor 350 and assembler 410 may be the same, only one block for both operations may be used. For example, a single block in conjunction with a signal multiplexer (not shown) may provide either a signal representing the set of individual physical channels or the base set of parallel data streams in alternating operations.

A controller 470 may connect to the assembler 410, filter bank 420a-N, and sample multiplexer 430. The controller 470 may control the final selection process and ordering of selected physical channels in assembler 410. The controller 470 may follow a pre-programmed allocation and ordering algorithm, or may process user inputs to determine the allocation and ordering. The controller 470 may also provide an interface for user inputs or a communications input in order to receive and convey the user requested channel information from multiple locations. As described earlier, a home or customer premises may supply more than one customer input. In addition, controller 470 may provide additional functions for operation of the assembler 410, filter bank 420a-N, and multiplexer 430 such as clock functions, as necessary. The controller 470 may also be embodied as a portion of a larger controller function responsible for controlling and managing, for instance, the entire re-synthesizer device.

Additionally, if the M signals at the input to the assembler 410 are less than the N original channels, the channel re-combiner may also change the overall sampling rate. The assembler 410 may be reconfigured to process the M signals in an M point transform, producing M parallel data streams. The filter bank may subsequently contain only M branches and the sample multiplexer process only M inputs. The clocks, supplied to the D/A converter as well as other blocks with diagram 400 may also be a scaled version of the clock used for digital channel selector 230. For instance, if M is one half the number N, then the clock signal for the digital channel re-combiner 240 may be one half the frequency of the clock signal for the digital channel selector 230. Note that the clock signal supplied to the other blocks working on parallel data streams may remain unaffected.

Further, the choice of value of M may be chosen for instance to permit a maximum of allowable channels at any time. However, in actual operation, a number less than M channels may actually be in use.

Figure 5:
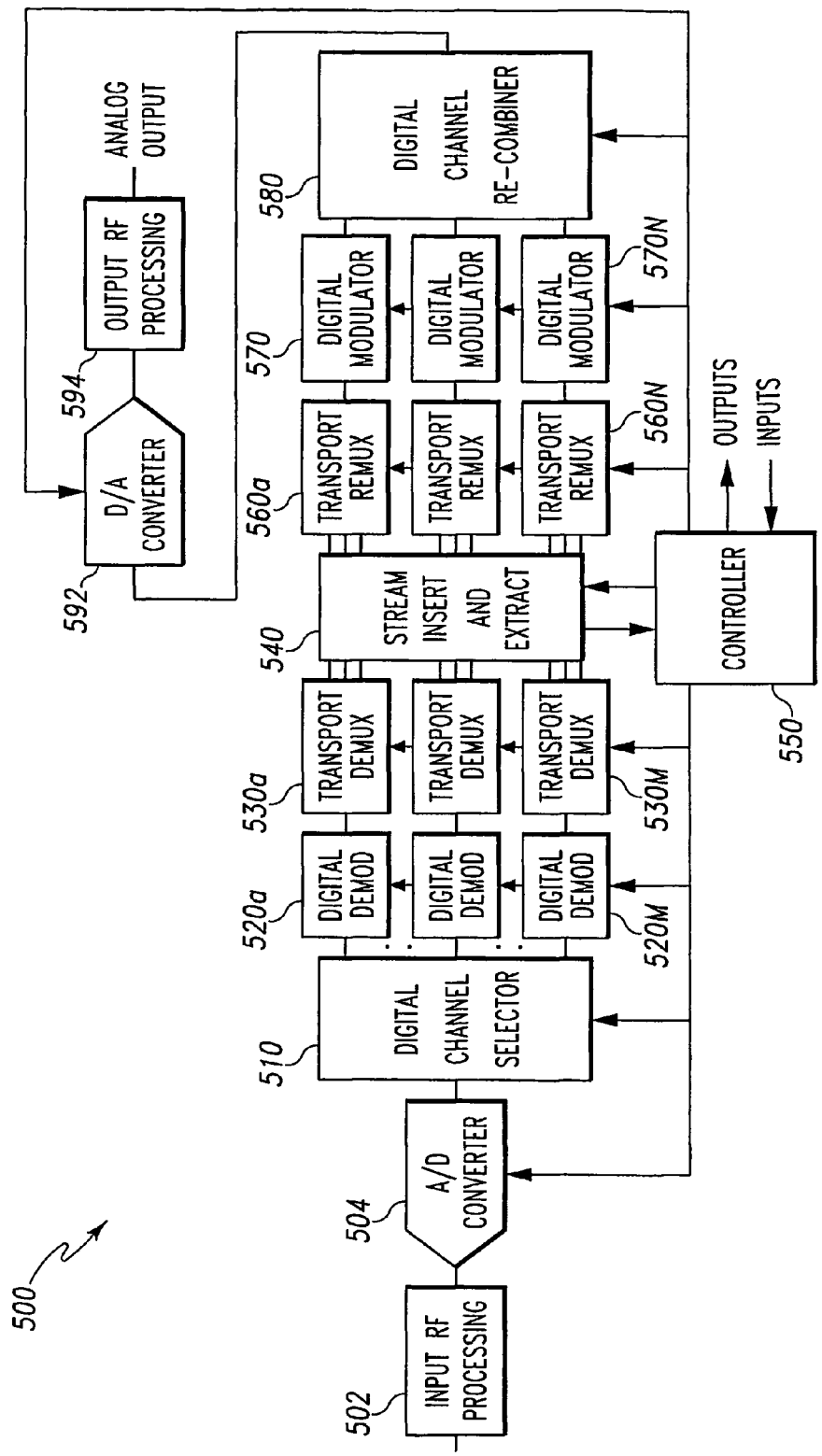
FIG. 5 is a block diagram of yet another embodiment of the present invention.

Turning now to FIG. 5, a block diagram 500 of a further embodiment of the present invention is shown. The diagram shows an implementation of the re-synthesizer 110 that includes digital signal processing and further includes program stream processing in order to increase the performance and available bandwidth for selected channels. In order to facilitate a further understanding of the invention, a re-synthesizer 110 will be described here using only a single L-band signal as an input. An input RF processing block 502 is connected to an A/D converter 504. The output of the ND converter is connected to a digital channel selector 510. The outputs of the digital channel selector 510 each individually connect to a digital demodulator (demod) 520a-M. Each digital demod 520a-M connects to a transport demultiplexer demux) 530a-M. The outputs of each transport demux 530a-M connect to a stream insert and extract block 540. The outputs of the stream insert and extract block connect to a set of transport remultiplexer (remux) blocks 560a-N. Each transport remux 560a-N connects to a digital modulator 570a-N. The outputs of the digital modulators 570a-N connect into a digital channel re-combiner 580. The output of the digital channel re-combiner 580 connects into a D/A converter 592. The output of the D/A converter 593 connects into an output RF processing block 594. A controller 550 also connects to all of the other blocks including the stream insert and extract block 540.

The operation of blocks identified as input RF processing block 502, A/D converter 504, digital channel selector 510, digital channel re-combiner 580, D/A converter 592, and output RF processing block 594 are similar in operation to blocks having the same name described previously. Except as noted, these blocks will not be further described.

The digital channel selector 510 provides a set of selected channels to the digital demods 520a-M. The digital demods 520a-M contain digital signal processing for the demodulation, transmission equalization, and error correction of the selected channels according to the required transmission standard prescribed for the selected channel. In a preferred embodiment, digital demods 520a-M include processing necessary to demodulate and decode transport streams sent in either Motion Picture Entertainment Group standard MPEG 2 or Joint Video Team (JVT) format using either a Quaternary Phase Shift Keying (QPSK) modulation format or 8-PSK modulation format. The digital demods 520a-N also perform error correction using either Viterbi, Reed Solomon, and/or Low Density Parity Check (LDPC) error correction techniques. Further details regarding the individual detailed operation of the digital demods 520a-M are well known by those skilled in the art.

Each of the digital demods 520a-M produces a transport stream representing one or more individual program streams multiplexed with additional identification data. As described previously, a transport stream contains one or more program streams usually in multiplexed and packetized form. A program stream may represent an audio or video signal or may represent data such as a program guide. Each transport stream is provided to one of the transport demuxes 530a-M. The transport demuxes 530a-M process the transport streams by first recovering and separating the identification data for the transport stream. The transport demuxes 530a-N use the identification data or program identifiers (PIDs) to separate out the program stream data in the transport stream into packets for each of the individual program streams. The transport demuxes 530a-M assemble the packets into separate individual program streams. The output of the transport demuxes 530a-M may supply the individual program streams on separate signal lines as shown, or may alternately provide the program streams along with the PIDs over a communications bus. In addition, stream identifiers are provided. These stream identifiers may include the PIDs supplied originally or may include new identification information sent along with the program streams. The stream identifiers may be used in further processing including reassembling the program streams back into transport streams.

The individual program streams are provided to the stream insert and extract block 540. The stream insert and extract block 540 allows removal and insertion of individual program streams into the set of individual streams present. The stream insert and extract block 540 may be able to remove program streams that are not required at the output and insert new program streams in place of the removed program streams. The new program streams may, for instance, represent content not present in the original signal. In a preferred embodiment, the new program stream represents local advertising and news content inserted in place of content in the original signal. The stream insert and extract block 540 may also be able to remove or introduce more than one stream at a time, and may include the ability to remove or introduce segments of program streams based on, for instance, time stamp identifiers present with the PIDs or stream identifiers.

The removal and insertion operations do not need to be matched and removed program streams are not required to be replaced in complete fashion by the insertion of new streams. However, the addition of new streams may not be possible without removing existing program streams. The new program streams may utilize the stream identifier information such as the PIDs from the removed program streams. Additionally, the PID information may be modified in order to facilitate new program guide data while the stream identifier may remain the same, in order to allow the new program stream to be processed correctly downstream.

The stream insert and extract block 540 is controlled by controller 550. The controller 550 provides the signal management for the stream insert and extract block 540 as well as providing a signal path for removing and introducing the program streams. In addition, the controller 550 provides connections to external circuitry (not shown) for supplying the removed program streams to other devices, or for inputting the new program streams from other devices. The controller 550 also manages inputs provided by users either directly or remotely. The controller 550 provides management of the program stream identifiers during the insertion and extraction used in processing the program streams. The controller 550 may also include the ability to generate and supply new program identification information including new program guide data for identifying the new program streams.

The output of the insert and extract block 540 contains groups of program streams that are provided to the transport remuxes 560a-N. The transport remuxes 560a-N process the groups of program streams, using the stream identifiers, and multiplex the streams back into remuxed transport streams. These remixed transport streams include any new program streams that were added replacing the removed program streams processed in the stream insert and extract block 540. In a preferred embodiment, streams. containing the stream identifiers originally grouped in transport streams at the output of digital demods 520a-M are remulitplexed together in each of the transport remuxes 560a-N. As with the program streams at the output of the transport muxes 530a-M, the output of the insert and extract block 540 may supply the individual program streams on separate signal lines, as shown, or may alternately provide the program streams along with the stream identifiers over a communications bus. The transport remuxes 560a-N process the individual program streams along with the stream identifiers to form a single packetized and multiplexed transport data stream containing identification data and program stream information.

Each output of the transport remuxes 560a-N is supplied to digital modulators 570a-N. In the digital modulators 570a-N, the transport streams are transformed into digital communications signals. The digital modulators 570a-N typically provide error correction processing to incorporate error correction into the signal. Additionally the digital modulators 570a-N include data to symbol mapping for creating a particular modulation signal format. In a preferred embodiment, digital modulators 570a-N include processing necessary to code and modulate transport streams for sending in either Motion Picture Entertainment Group standard (MPEG 2) or Joint Video Team (JVT) format using either a Quaternary Phase Shift Keying (QPSK) modulation format or an 8-PSK modulation format. The digital modulators 570a-N also generate and insert error correction information using either Viterbi, Reed Solomon, and/or Low Density Parity Check (LDPC) error correction techniques. Further details regarding the individual detailed operation of the digital modulators 570a-N are well known by those skilled in the art.

It is important to note that the digital modulation format provided by the digital modulators 570a-N may be the same as the format used in processing the signals in the digital demods 520a-M. However, the modulators 570a-N may provide output signals in an alternate format, including formats such as 64 point Quadrature Amplitude Modulation (64QAM). It is important to note that the format chosen in modulator 570a-N may most likely match a format that can be processed in the downstream customer equipment including settop boxes.

Figure 6:
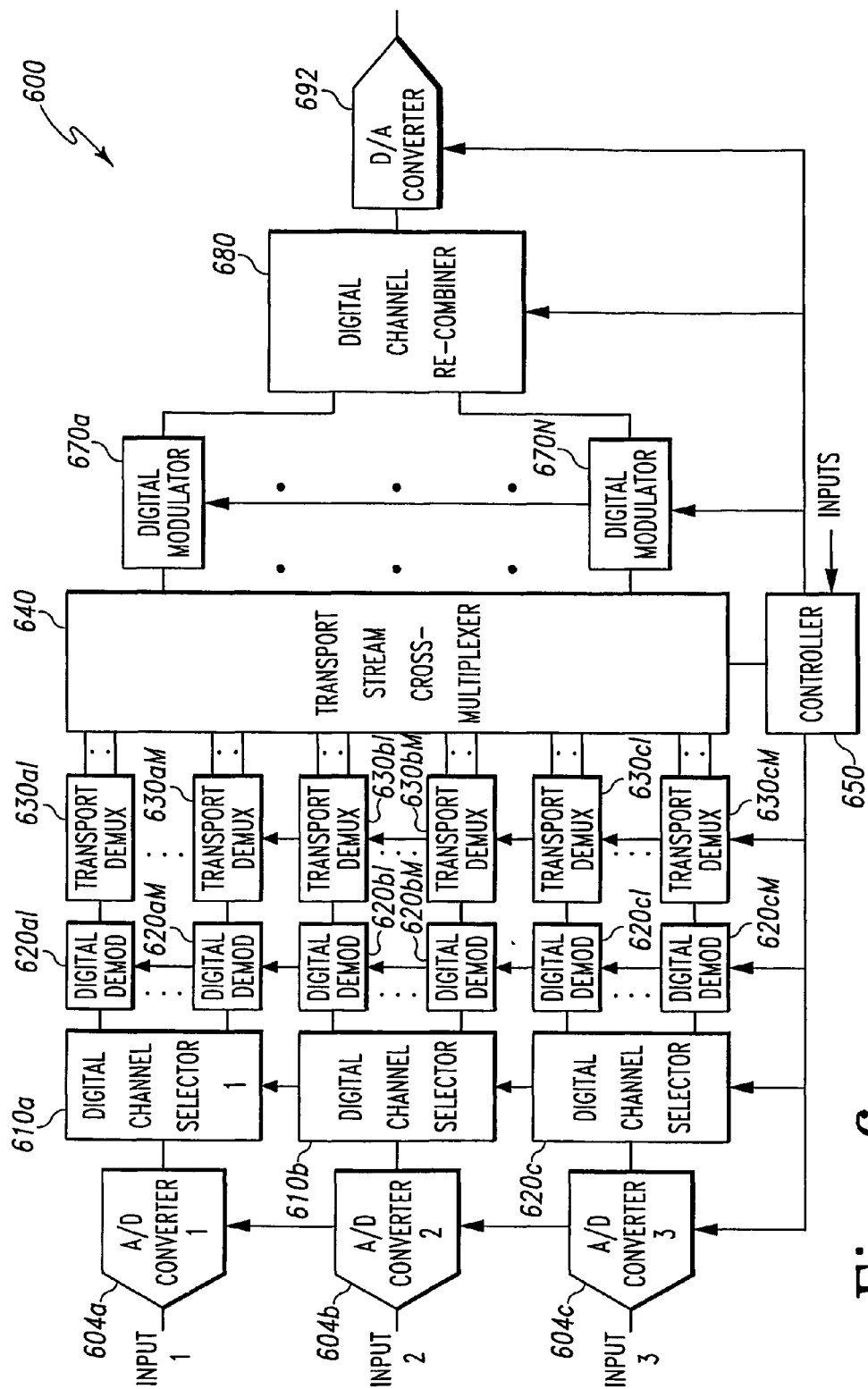
FIG. 6 is a block diagram of a further embodiment of the present invention.

Turning now to FIG. 6, a block diagram 600 of another embodiment of the present invention is shown. FIG. 6 illustrates a three L-band signal input re-synthesizer utilizing the inventive concept described herein. Each L-band input signal is processed through RF input processing, not shown.

The processed L-band input signals are connected to A/D converters 604a-c. The outputs of the A/D converters 604a-c are connected to digital channel selectors 610a-c. The outputs of the digital channel selectors 610a-c each individually connect to groups of digital demods 620a1-aM, 620b1-bM, and 620c1-cM. Each of the digital demods 620a1-aM, 620b1-bM, and 620c1-cM connects to groups of transport demuxes 630a1-aM, 630b1-bM, and 630c1-cM. The one or more outputs of each of the transport demuxes 630a1-aM, 630b1-bM, and 630c1-cM connects to a transport stream cross-multiplexer 640. The outputs of the transport stream cross-multiplexer 640 connect to a set of digital modulators 670a-N. The outputs of the digital modulators 670a-N connect into a digital channel re-combiner 680. The output of the digital channel re-combiner 680 connects into a D/A converter 692. The output of the D/A converter 692 may connect to further RF processing (not shown) prior to providing an output for transmitting on a coaxial cable. A controller 650 also connects to all of the other blocks including the transport stream cross-multiplexer 640.

The operation of blocks identified as A/D converters 604a-c, digital channel selectors 610a-c, digital demods 620a1-aM, 620b1-bM, and 620c1-cM, transport de-muxes 630a1-aM, 630b1-bM, and 630c1-cM, digital modulators 670a-N, digital channel re-combiner 680, and D/A converter 692 are similar in operation to blocks having the same name and described previously. Except as noted, these blocks will not be further described.

Each digital channel selector 610a-c is capable of producing M outputs representing M physical channels where M is less than or equal to the N original physical channels from an L-band signal. Each L-band signal may provide a different number of physical channels for eventual use in the final output signal as was described previously.

Each of the selected channels from digital channel selectors 610a-c is then further demodulated in the digital demod blocks 620a1-aM, 620b1-bM, and 620c1-cM. The output transport streams are then processed in the transport demuxes 630a1-aM, 630b1-bM, and 630c1-cM. Each transport demux 630a1-aM, 630b1-bM, and 630c1-cM. produce one or more individual program streams along with stream identifiers as described previously. The stream identification will permit further processing including the reassembling into a new transport stream described below.

The individual programs streams, along with the stream identifiers, are provided to the transport stream cross-multiplexer 640. The transport stream cross-multiplexer 640 allows programs streams from different transport originally streams to be combined or multiplexed together to form new transport streams. The transport stream cross-multiplexer 640 further selects and groups the selected program streams for processing to form transport streams. Each group of selected program streams, along with the stream identifiers is packetized and further multiplexed together to form new transport streams. For example, program streams one and two are requested from a particular channel delivered as a multiplex of channels from a first satellite but not a program stream three. Also, program stream one is requested from a particular channel delivered as a multiplex of channels from a second satellite, but not program streams two, three, and four. The transport stream cross-multiplexer 640 may assign program stream one from the second satellite channel as program stream three of the first satellite channel and also make the necessary stream identification changes. The transport stream cross-multiplexer 640 may then remultiplex the three program streams to create a new transport stream.

The selected program streams and stream identifiers are re-multiplexed or packaged to permit more efficient delivery of the selected program content by the user. The number of new transport streams, N, may be different from the number of transport streams that were supplied to the transport stream cross-multiplexer 640. The number of transport streams used is a matter of design choice, but may not exceed the number of available channels in the final output signal. Further, as described previously, the order of the transport streams may be changed by the transport stream cross-multiplexer 640 from the order of the transport streams provided by the digital demods 620a1-aM, 620b1-bM, and 620c1-cM.

The transport stream cross-multiplexer 640 is controlled by controller 650. The controller 650 provides the signal management for the transport stream cross-multiplexer 640 such as managing the packetization and time stamp indicators provided as part of the stream identification. The controller also provides new stream identification information, for instance, in the form of new PIDs. The new identification information is used in the formation of the new transport streams in the transport stream cross-mulitplexer 640. The controller 670 also manages inputs provided by users, provided either directly or remotely. The controller 670 may also include the ability to generate and supply new program identification information including new program guide data for identifying the program streams within the new transport streams.

Each of the new transport streams from the transport stream cross-multiplexer 640 is provided to the digital modulators 670a-N. As described previously, the digital modulators 650a-N modulate the transport streams using a particular encoding and modulation format to form modulated channels of information. Additionally, the format provided by the modulator may be the same as the format used in processing the signals in the digital demods 620a1-aM, 620b1-bM, 620c1-cM. However, the modulator may provide the output signals in an alternate format, including formats such as 64 QAM. It is important to note that the format chosen in the modulator should match a format that can be processed the downstream customer equipment such as settop boxes or other network equipment.

Each of the modulated channels from the digital modulators 670a-N is provided to the digital channel re-combiner 680. The digital channel re-combiner 680 may process up to N channels in its assembler block as described above. The assembler in the digital channel re-combiner 680 may also includes switching and selection circuits to manage which of the M inputs originally provided from each of the digital channel selectors 530a-c are processed in the digital channel re-combiner 680. The management and switching function is controlled by the controller 650.

The digital channel re-combiner 680 may also contain signal processing such as digital signal level adjustment applied to each of the selected channels. Level adjustment may allow all selected channels to be delivered at approximately the same signal level improving the performance of the home equipment.

Block diagram 600 forms a multi-input, single output channel selection, translation, stream processing, and distribution device. The device produces an output of up to N channels in a single signal for delivery over a single coaxial cable, from an input containing up to three times N possible input channels presented in three separate signals. The selected channels are then digitally demodulated to the bit packet level and disassembled into program streams. The various program streams and their associated identifiers may then be re-combined into new physical channels, with new identifiers if needed, and digitally re-modulated into a single signal. The re-synthesizer would create a new cross-signal re-multiplexed RF output. The re-synthesizer allows collecting sets of programs to be simultaneously viewed on the same set of channels that is different and more efficiently presented to the user than providing the original set of signals. Note, that the use of three inputs is illustrative, and a greater or fewer number of inputs containing a greater or fewer number of possible input channels may be used.

It is also possible that the functions described in the stream insert and extract block 540 and the transport stream cross-multiplexer 640 may be combined and used in the same re-synthesizer. For instance, in a multi-dwelling unit installation, the combined transport cross-multiplexer and stream insert and extract block may be used to provide a signal containing program streams arranged into new channels as requested by the various occupants of the dwelling units as well as provide local community events in a program stream provided to all occupants.

Figure 7:
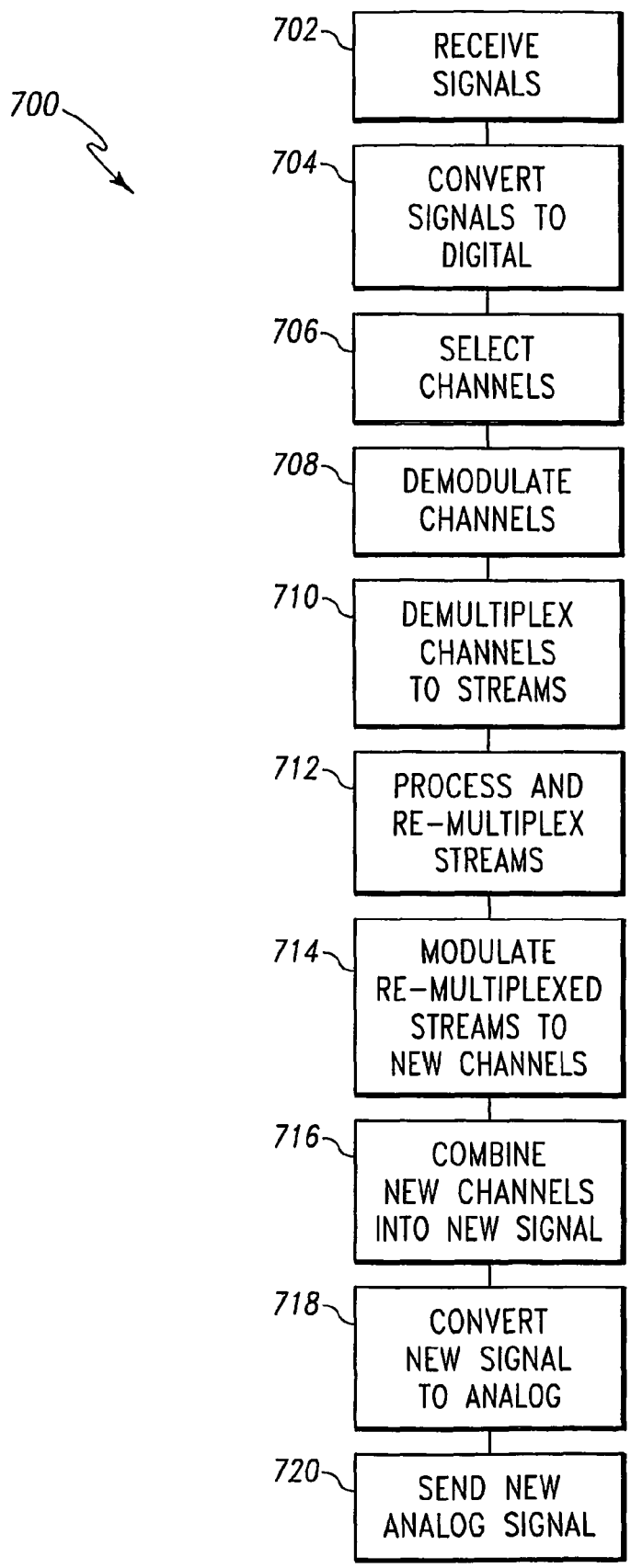
FIG. 7 is a flow chart illustrating a method of the present invention.

Turning now to FIG. 7, a flow chart 700 utilizing the present invention is shown. At step 702, one or more incoming satellite signals are received by a device, such as the re-synthesizer described in block diagram 600. Next at 704, the one or more incoming satellite signals are converted to digital signals. The conversion is preferably performed by A/D converters 604a-c, and may further include processing for separating the individual physical channels after the conversion such as described in digital channel selectors 610a-c. Next, at step 706, the desired physical channels are selected to form a group of selected frequency channels. The selected frequency channels may be outputs from digital channel selectors 610a-c. The selected frequency channels may be selected in digital channel selectors 610a-c based on requests by the customer's home equipment. The selection process may be managed by controller 650. The controller 650 may be responsible for receiving and managing multiple requests and providing the proper information to the digital channel selectors 610a-c.

Next, at step 708, the selected digital channels are demodulated. The demodulation may occur in digital demods 620a1-aM, 620b1-bM, and 620c1-cM. At step 710, the demodulated channels, now represented as transport streams, are demultiplexed into individual program streams. The demultiplexing may take place in the transport demuxes 630a1-aM, 630b1-bM, and 630c1-cM. Next at step 712, the individual program streams are processed to form new transport streams. Step 712 may involve removing existing program streams and inserting new programs for use in the in the new transport streams such as described in the stream insert and extract block 540. Step 712 may also provide the ability to re-arrange and recombine the program streams to form new transport streams such as described in transport stream cross-multiplexer 640.

Next, at step 714, the new transport streams are modulated into new channels. The modulation may be accomplished in digital modulators 670a-N. The modulation format used in modulators 670a-N may be the same as the format the original L-band signals were provided in. However, the format may also be different and may instead match a format that can be processed by downstream equipment such as settop boxes.

Next, at step 716, the group of new channels is re-combined in a frequency diverse manner to form a signal occupying a range of frequencies and containing the channels at separate frequencies. The recombination may include a means for processing the group of selected digital channels such as described in digital channel re-combiner 680. At step 718, the recombined frequency diverse digital signal is converted back into an analog signal containing the selected channels at separate frequencies. The conversion may be performed in D/A converter 692. Finally, at step 720, the analog signal, representing the selected program streams from the selected channels is provided as an output supplied for transmission to other devices such as settop boxes and/or home network equipment.

While the invention may be susceptible to various modifications and alternative forms, specific embodiments have been shown by way of example in the drawings and have been described in detail herein. The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements of may be implemented in hardware, software, or a combination of both. It is therefore to be understood that numerous modifications may be made to the illustrative embodiments and that other arrangements may be devised without departing from the scope of the present invention as defined by the appended claims.

What is claimed is:

1. An apparatus comprising:
   a receiver for receiving a plurality of digitally multiplexed signals, each digitally multiplexed signal associated with a different physical transmission channel, and for simultaneously recovering from at least two of the digital multiplexes a plurality of bit streams, said receiver including a sampler for sampling the signal to provide a plurality of decimated sample streams and a distributor operatively connected to said sampler for processing said plurality of decimated sample streams to provide output signals representative of said one or more different physical channels; and
   a transmitter for inserting the plurality of bit streams into different digital multiplexes and for modulating the different digital multiplexes for transmission on different transmission channels,
   wherein said receiver includes a transform element including a first plurality of filters and said transmitter includes an inverse transform element including a second plurality of filters.

2. The apparatus of claim 1, wherein said sampler further comprises:
   a demultiplexer for demultiplexing the signal into said plurality of decimated sample streams.

3. The apparatus of claim 1, wherein said receiver further comprises a selector operatively connected to said distributor for selecting a subset of output signals representative of said one or more different physical channels.

4. The apparatus of claim 1, wherein said receiver further comprises a demodulator operatively coupled to said selector for processing said subset of output signals and generating said plurality of bit streams.

5. The apparatus of claim 1, wherein said transmitter further comprises:
   a bit stream processor for processing said plurality of bit streams into said new digital multiplexes; and
   a modulator connected to said bit stream processor for modulating said new digital multiplexes into a set of selected physical channels.

6. The apparatus of claim 5, wherein said bit stream processor includes a processor for inserting new bit streams into said new digital multiplexes not present in said plurality of digital multiplexes.

7. The apparatus of claim 5, wherein said bit stream processor includes a processor for re-arranging said bit streams between said plurality of digital multiplexes and said new digital multiplexes.

8. The apparatus of claim 1, wherein said modulator is a modulator capable of modulating signals for reception by a satellite signal receiver.

9. The apparatus of claim 1, wherein said transmitter further comprises:
   an assembler operative on said selected physical channels to provide a set of parallel data streams representing the combination of said selected physical channels; and
   a converter for converting said parallel data streams into said different physical transmission channels.

10. The apparatus of claim 9, wherein said converter further comprises:
a multiplexer connected to said second plurality of filters for multiplexing said plurality of parallel data streams into a single sample stream containing said different physical transmission channels.

11. The apparatus of claim 1, wherein said different transmission channels are included in one signal.

12. The apparatus of claim 1, wherein said plurality of bit streams include a plurality of program streams containing audio, video, or data information.

13. A method for re-synthesizing signals comprising:
receiving a first signal having a plurality of different program streams in different frequency channels;
selecting a set of program streams from said plurality of different frequency channels, wherein the step of selecting said set of program streams also includes decimating said first signal into a plurality of decimated sample streams and performing a transform on said plurality of decimated sample streams to provide said set of program streams;
combining said set of program streams to form a second signal, wherein said step of combining said set of program streams includes performing an inverse transform on said set of program streams to provide a plurality of parallel decimated data streams and processing said plurality of parallel decimated data streams to provide said second signal; and
transmitting said second signal.

14. The method claim 13, wherein the step of decimating includes:
demultiplexing the signal into the number of decimated sample streams; and
processing the number of decimated sample streams with a plurality of filters for matching the discrete cosine transform.

15. The method of claim 13, wherein the step of selecting includes re-ordering said set of program streams.

16. An integrated circuit for use in a receiving system, which receives signals representing a plurality of channels, the integrated circuit comprising:
a demultiplexing element for demultiplexing a received sampled signal to produce a plurality of first data streams;
a transform element for performing a transform on said plurality of first data streams to produce a plurality of transform output signals, and for performing an inverse transform on at least two of a plurality of transform input signals to produce a plurality of second data streams;
a bit stream processing element for processing said plurality of transform output signals to select a set of bit streams and to combine said selected bit streams into said at least two of a plurality transform input signals; and
a multiplexing element for multiplexing said plurality of second data streams and outputting a sampled signal.

17. The integrated circuit of claim 16, wherein said transform element uses a type IV discrete cosine transform.

18. The integrated circuit of claim 16, further comprising:
a first filter element operative to filter said plurality of first data streams prior to providing said plurality of first data streams to said transform element ; and
a second filter element operative to filter said plurality of second data streams prior to providing said plurality of second data streams to said multiplexing element.

19. The integrated circuit of claim 16, further comprising:
a demodulator element for demodulating said plurality of transform output signals prior to providing said plurality of transform output signals to said bit stream processing element; and
a modulator element for modulating said at least two transform output signals prior to providing said least two transform output signals to said transform element.

20. An apparatus for re-synthesizing signals comprising:
means for receiving a first signal having a plurality of bit streams from different frequency channels;
means for decimating said first signal into a plurality of decimated sample streams;
means for performing a transform on said plurality of decimated sample streams to provide a set of signals representing said first signal;
means for selecting a set of bit streams from said set of signals;
means for performing an inverse transform on said set of selected bit streams to provide a plurality of parallel decimated data streams;
means for processing said plurality of parallel decimated data streams to provide a set of second data streams;
means for combining said set of second data streams to form a second signal; and
means for transmitting said second signal.

* * * * *